United States Patent
Brady et al.

(10) Patent No.: US 7,120,276 B1
(45) Date of Patent: Oct. 10, 2006

(54) METHOD AND APPARATUS FOR IMAGE PROCESSING

(75) Inventors: John Michael Brady, Oxford (GB); Paul Michael Hayton, Oxford (GB); Stephen Mark Smith, Oxford (GB)

(73) Assignee: Mirada Solutions Limited, Oxfordshire (GB)

( * ) Notice: Subject to any disclaimer, the term of this patent is extended or adjusted under 35 U.S.C. 154(b) by 0 days.

(21) Appl. No.: 09/936,998

(22) PCT Filed: Mar. 17, 2000

(86) PCT No.: PCT/GB00/01020

§ 371 (c)(1),
(2), (4) Date: Feb. 7, 2002

(87) PCT Pub. No.: WO00/57361

PCT Pub. Date: Sep. 28, 2000

(30) Foreign Application Priority Data

Mar. 19, 1999 (GB) ............................. 9906420.6

(51) Int. Cl.
*G06K 9/00* (2006.01)
(52) U.S. Cl. ................. 382/107; 382/154; 382/275; 382/294
(58) Field of Classification Search ............. 382/107, 382/131, 132, 294, 295, 154, 275; 600/431; 378/901
See application file for complete search history.

(56) References Cited

U.S. PATENT DOCUMENTS 5,214,382 A * 5/1993 Harms et al. ............. 324/309
6,157,677 A * 12/2000 Martens et al. ......... 375/240.16

FOREIGN PATENT DOCUMENTS

| EP | 652536 A2 * | 5/1995 |
| GB | 2 268 351 | 1/1994 |
| GB | 2 269 508 | 2/1994 |
| WO | WO 95/26539 | 10/1995 |

OTHER PUBLICATIONS

Cham et al, "A Statistical Framework for Long-Range Feature Matching in Uncalibrated Image Mosaicing", Computer Vision and Pattern Recognition, Proceedings 1998 IEEE Computer Society Conference on Jun. 23-25 1998, pp. 442-447.*

Strickland et al, Computing Correspondence in a Sequence of Non-Rigid Shapes, Pattern Recognition, Pergamon Press Inc., Elmsford, NY, vol. 25, No. 9, Sep. 1, 1992, pp. 901-912.

* cited by examiner

*Primary Examiner*—Bhavesh M. Mehta
*Assistant Examiner*—Christopher Lavin
(74) *Attorney, Agent, or Firm*—Nixon & Vanderhye, PC

(57) ABSTRACT

An example system and method for processing image data of a plurality of time-separated images of a non-rigid body to detect movement of the body involves calculating and storing, for each of a plurality of sampling points in each image, a plurality of candidate movements together with the estimated probability of each candidate. For each sampling point, the probability of each of the candidate movements is recalculated based on the stored probability of that candidate movement and the probabilities of the candidate movements at neighboring sampling points. A motion field indicative of the non-rigid body movement is generated from the recalculated probabilities.

20 Claims, 10 Drawing Sheets (A) Pre-contrast image (B) Post-contrast image

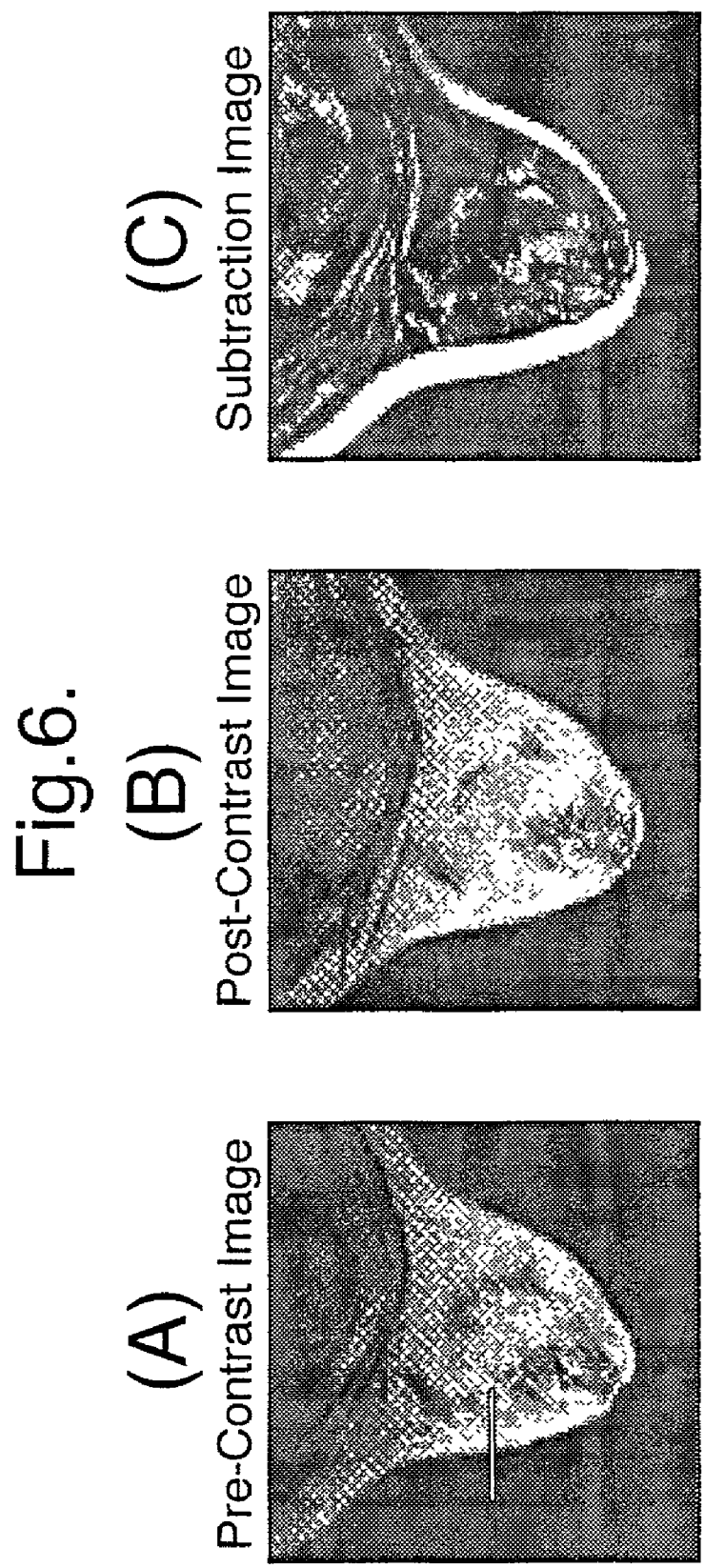

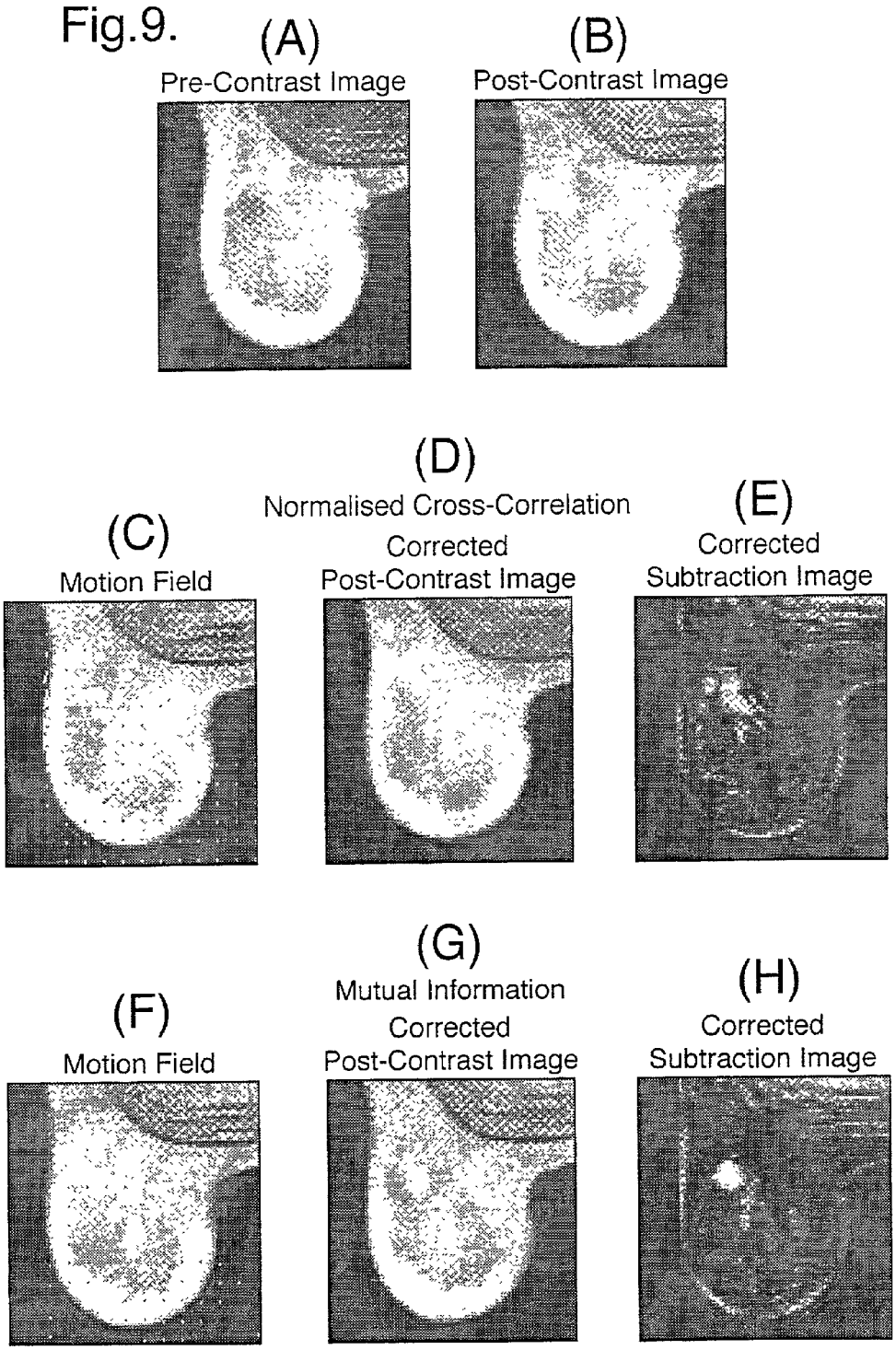

Fig. 10.

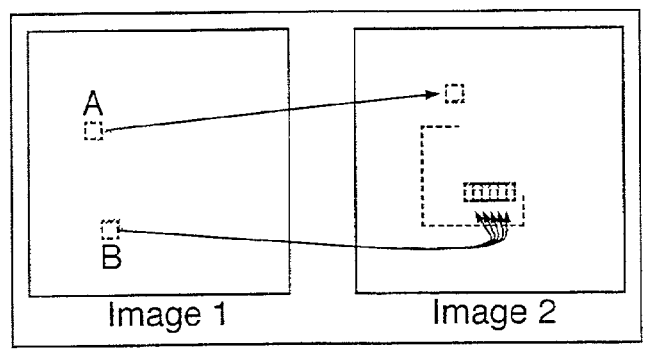

Fig. 11.

A
$$\begin{pmatrix} 30 & 30 & 30 & 30 & 30 & 35 & 45 & 50 & 45 \\ 30 & 30 & 30 & 30 & 30 & 40 & 50 & 100 & 50 \\ 30 & 30 & 30 & 30 & 30 & 35 & 45 & 50 & 45 \\ 30 & 30 & 30 & 30 & 30 & 30 & 30 & 30 & 30 \\ 30 & 30 & 30 & 30 & 30 & 30 & 30 & 30 & 20 \\ 30 & 30 & 30 & 30 & 30 & 30 & 30 & 30 & 20 \\ 30 & 30 & 30 & 30 & 30 & 30 & 30 & 30 & 20 \\ 30 & 30 & 30 & 30 & 30 & 30 & 30 & 30 & 20 \\ 30 & 30 & 30 & 30 & 30 & 30 & 30 & 30 & 20 \end{pmatrix}$$

Optic flow corresponding to maximum score is (3,3)

B
$$\begin{pmatrix} 40 & 50 & 60 & 70 & 80 & 80 & 80 & 80 & 80 \\ 40 & 50 & 65 & 75 & 100 & 100 & 100 & 100 & 100 \\ 40 & 50 & 60 & 70 & 85 & 85 & 85 & 85 & 85 \\ 40 & 45 & 55 & 60 & 70 & 70 & 70 & 70 & 70 \\ 40 & 43 & 45 & 50 & 55 & 55 & 55 & 55 & 55 \\ 40 & 40 & 40 & 40 & 40 & 40 & 40 & 40 & 40 \\ 40 & 40 & 40 & 40 & 40 & 40 & 40 & 40 & 40 \\ 40 & 40 & 40 & 40 & 40 & 40 & 40 & 40 & 40 \\ 40 & 40 & 40 & 40 & 40 & 40 & 40 & 40 & 40 \end{pmatrix}$$

Optic flows corresponding to maximum score are (0,3), (1,3),(2,3),(3,3),(4,3)

METHOD AND APPARATUS FOR IMAGE PROCESSING

This application is the national stage of PCT/GB00/01020, filed on Mar. 17, 2000, which designated the United States.

BACKGROUND AND SUMMARY

This invention relates to a method and apparatus for processing image data, and in particular for processing a sequence of images of a non-rigid body to correct for movement of the non-rigid body between the images.

There are many applications in which it is useful to detect corresponding features in successive images of a body, for instance to allow detection of the movement of the body and to correct for movement of it. Many methods have been proposed for detecting such corresponding features. The successful detection of corresponding features in successive images allows the registration of the images, i.e. allows subsequent images to be transformed to eliminate differences caused by motion.

A common way to detect motion in successive images is to use landmark and segmentation based algorithms (also known as sparse matching). In such methods, geometric features which can be recognised in each image are matched, and these features are used to generate a transformation which can be applied to the whole image. However, this method is not useful for images which lack recognisable geometric features.

For instance, in the field of diagnosis of breast cancer, an imaging technique which is currently being explored is magnetic resonance imaging (MRI). FIG. 1 of the accompanying drawings shows schematically the arrangement for MRI of a human breast in which the patient 1 lies prone inside the main MR coil 3 on a couch 5. With this arrangement the breasts hang pendulously inside the double breast coil 7 as shown diagrammatically in FIG. 2. This technique has certain advantages as compared with, for instance, x-ray mammography, in that its use is not restricted to post-menopausal women or to breasts which do not include scar tissue, and it is also a 3-D technique (actually producing a set of vertically displaced 2-D slices). However, it does have certain problems. Firstly, abnormalities in the breast cannot be distinguished in a standard MRI image. To detect abnormalities it is necessary to inject a paramagnetic compound (typically Gd-DTPA) as a contrast agent and then scan every minute for approximately 7 minutes to monitor the take up of the contrast agent. Each scan consists of 16 slice images in, for instance, the X, Y plane as shown in FIG. 1. Because of the length of time over which imaging occurs, it is very likely that the patient will move during that time. These movements make it difficult, or sometimes impossible, to interpret the succession of images because not only are the images changing through take up of the contrast agent, but also because of movement of the patient. For instance FIG. 3(A) illustrates a pre-contrast image and FIG. 3(B) a post-contrast image in which the patient relaxed the pectoral muscle between the two images. The pectoral muscle can be seen as the darker grey tissue towards the top of the image. It can be seen that the effect of relaxation is to change the shape of the breast and cause non-rigid movement in the tissue surrounding the muscle. Such non-rigid movement is difficult to compensate for.

It will also be appreciated from FIG. 3 that the images are not of the type in which there are clearly recognisable geometric features which can help to detect the movement between images. Further, because the contrast agent is being taken up during the imaging process, features which have one level of brightness in a first image will not necessarily have the same value of brightness in a subsequent one (the image is said to be non-conservative). In fact, the features which are of most interest (abnormalities such as tumours) take up the contrast agent quicker than other tissue and so inevitably, and deliberately, will be changing in intensity between the different images.

Thus these images are of the type which require correction for motion, but which are not susceptible to normal motion detection techniques.

The present invention provides a technique for detecting and correcting successive images for movement where the movement is non-rigid-body movement and where the images may be themselves changing as a function of time. It is therefore applicable to images which have non-conservative flow, i.e. the total amount of brightness in the image changes. The invention is not only applicable to MRI techniques, but other non-conservative image flows where there is movement between images.

The present invention achieves this by calculating and storing for each of a plurality of sampling points in the image a probability map for the displacement of that point between the image and a time separated image. Thus not only one possible displacement is considered for each sampling point, but instead all are considered. This probability map, namely the probabilities that the sampling point has moved in a particular direction, is then refined in an iterative process by considering the probability maps for sampling points neighbouring it.

Thus whereas with previously proposed techniques only one "optimal" displacement vector was considered for each sampling point, with the present invention all are considered and stored for future processing. With the previous techniques a first estimate of the motion field was made based on the single optimal vector for each point, and then the field was refined by iteratively recomputing those vectors. However, in non-rigid flow there can be several plausible motions locally and so algorithms which ignore that fact can fall into local minima which do not correspond to the ultimately optimal solution during the iterative process. Because the present invention retains the fact that there are several possible alternatives to the "optimal" displacement vector, it can avoid being trapped in incorrect local minima.

Thus in more detail, the present invention provides a method of processing image data of a plurality of time-separated images of a non-rigid body to detect movement of the body, comprising the steps of:— for each of a plurality of sampling points in each image calculating and storing a plurality of candidate movements together with the estimated probability of each candidate;

iteratively recalculating for each sampling point the probability of each of the candidate movement based on the stored probability of that candidate movement and the probabilities of the candidate movements at other sampling points; and generating from the recalculated probabilities a motion field indicative of the non-rigid body movement.

The sampling points are set as a regular array over the image and the said other sampling points which are considered in the recalculation process are preferably neighbouring sampling points. The sampling points need not correspond to individual pixels in the image, but are preferably spaced by several pixels.

The estimated probabilities for the candidate movements are found by using a similarity measure which indicates the similarity of each sampling point to sampling points in the preceding image. The similarity measures can be converted into probabilities by simply normalising them for each sampling point so that they sum to unity. The candidate movements are, of course, the vector displacements which map the respective sampling points in the preceding image to the current sampling point.

As mentioned above a problem with non-conservative images such as MRI images when a contrast agent is being dynamically taken-up, is that points of a certain intensity in one image cannot be expected to have the same intensity in another. The present invention overcomes this problem by careful choice of similarity measure, and in particular by selecting the similarity measure from mutual information, normalised mutual information or entropy correlation coefficient.

The iterative recalculation of the stored probabilities comprises multiplying each stored probability by the product of the stored probabilities for the neighbouring sampling points. Preferably the only maximum probability for each of the neighbouring points is taken, more preferably weighted according to the difference between the candidate movement and the maximum probability movement of the neighbouring sampling point. The recalculation can also be limited to use only movements which are judged to be similar to the movement of the sampling point under consideration, for instance where the magnitude of the displacement caused by the movements differ by less than a preset amount.

The number of iterations in the recalculation can be set as desired, conveniently according to the distance between salient points in the image.

Once the probabilities of the candidate movements have been refined by the iterative process, the motion field is generated by selecting as the movement at each sampling point that candidate movement which has the maximum probability. This motion field can then be used to correct later images in the sequence by converting the motion field into a transformation which can be applied to each pixel. The motion field can be converted to a transformation either by interpolation or by fitting a parametric transformation to the motion field.

Having corrected the images it is possible to repeat the process using differently spaced sampling points, for instance more closely spaced sampling points, and preferably to do this iteratively to further refine the detection of the motion field and registration of the different images.

The invention also provides a corresponding apparatus for processing image data and the invention can be embodied as a computer program which may, for instance, be stored on a computer readable storage medium.

BRIEF DESCRIPTION OF THE DRAWINGS

The invention will be further described by non-limitative example with reference to the accompanying drawings in which:

FIG. 9 illustrate pre and post-contrast images using different similarity measures;

FIG. 10 illustrates two images with a mutual displacement; and

FIG. 11 shows the similarity scores for two sample points in the FIG. 10 image.

DETAILED DESCRIPTION OF EXAMPLE EMBODIMENTS

Figure 1:
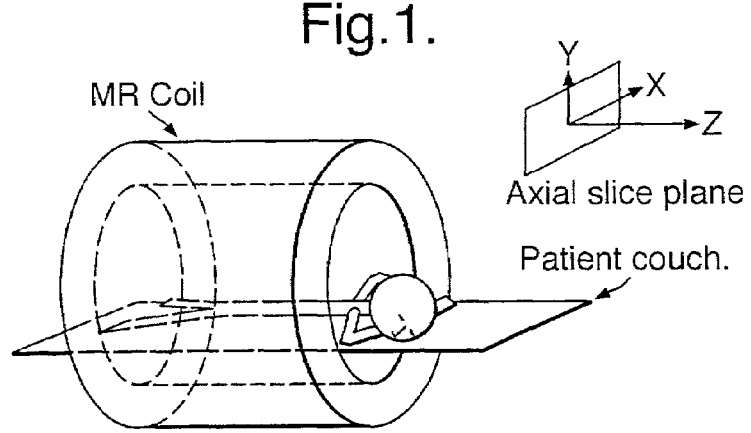
FIG. 1 is a diagrammatic representation of the arrangement for MRI examination of a patient.
Figure 2:
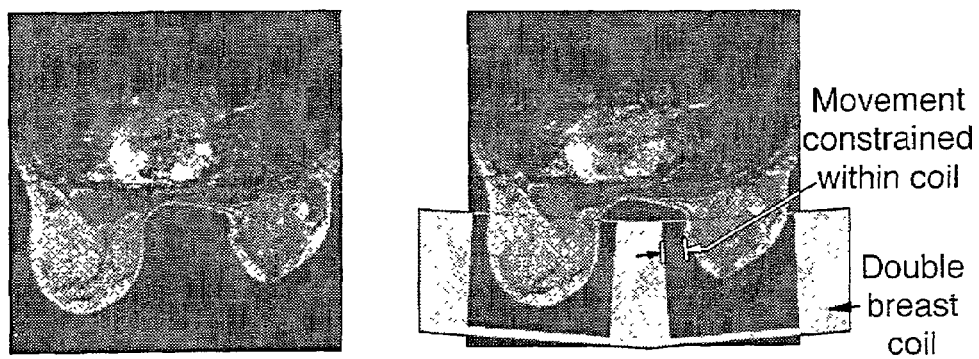
FIG. 2 illustrates a typical magnetic resonance image of both human breasts and a diagrammatic representation of the position of the double breast coil of the apparatus.
Figure 3:
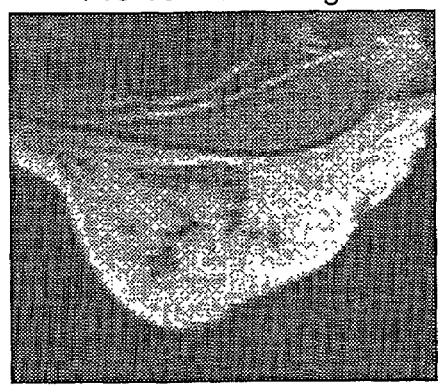
FIGS. 3(A) and (B) illustrate example pre-contrast and post-contrast images of a human breast.
Figure 3:
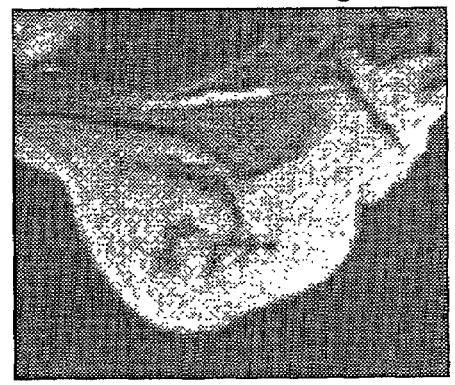

Any image registration algorithm, i.e. an algorithm for detecting and correcting for movement between images, requires a method of determining whether two sub-images represent the same part of the imaged object. In the case of breast MRI, this amounts to determining whether the two sub-images represent the same anatomical location. As mentioned above, while many prior techniques rely on recognising geometrical features, this is not suitable for all images, especially images from breast MRI. Magnetic resonance signal intensity is a subject to change between images because of the deliberately induced contrast enhancement, and this change can be of the order of 100%. Further, the deformation which results from the movement is non-rigid. Thus the method of determining whether the two sub-images represent the same physical location is important. In this embodiment of the invention this is achieved by using a "similarity measure", of which there are several types.

One measure which can be used is the normalised "centred" cross-correlation:—

$$S(r, u) = \frac{\sum (I_1(r) - \mu)(I_2(r+u) - \mu_2)}{(\sum (I_1(r) - \mu_1)^2 \sum (I_2(r+u) - \mu_2)^2)^{\frac{1}{2}}} \text{ where}$$

$$\mu = \frac{1}{N}\sum_{i=0}^{N-1} I(r_i)$$

This is a measure of the least squares residual error from fitting, a line to a set of data and consequently for registration can be expect to perform best when there exists a linear relationship between the image intensities.

Another similarity measure, which is used in the embodiments of the present invention because of its suitability for breast MR images, is the "mutual information". Mutual information (or relative entropy) is a statistical measure that describes how likely it is that a random variable Y is functionally related to X. It is defined in terms of the entropy and joint entropy of the random variables X and Y. Entropy can be interpreted as either the degree of disorder or the information content of X. It is defined by:

$$H(X) = -\int p(x) \ln p(x) dx$$

which can be estimated discretely for N intensity quanta $p_i$ by:

$$H(X) = -\sum_{i=0}^{i=N-1} p_i \ln p_i$$

Just as joint and conditional probability distributions can be used to relate co-occurrences of two random variables, joint and conditional entropies relate the predictabilities of two random variables. Conditional and joint entropies are defined respectively as:

$$H(Y|X) = -\int\int p(y|x)\ln p(y|x)dxdy$$

$$H(Y,X) = -\int\int p(y,x)\ln p(y,x)dxdy$$

$$= -\sum_{i=0}^{N-1}\sum_{j=0}^{N-1} p_{i,j}\ln p_{i,j}$$

Conditional entropy is a measure of the randomness of Y given knowledge of X. As Y becomes more dependent on X, H(Y|X) gets smaller. On its own, this is not a measure of dependency, since a small value of H(Y|X) may only imply H(Y) is small.

The mutual information is defined as:

$$M(X, Y) = H(Y) - H(Y|X)$$

The conditional entropy can be expressed in terms of the joint entropy:

$$H(Y|X) = H(X,Y) - H(X)$$

so that the mutual information can be written as:

$$M(X,Y) = H(X) + H(Y) - H(X,Y) \quad (I)$$

In maximizing this measure, transformations are encouraged such that the two sample windows are functionally related.

Mutual information is consequently a statistical measure for which the only assumption required is that two pixels that have the same intensity in the first image also have the same intensity in the second image. In Breast MR images, this is not always true over the whole image—places where it does not hold are of diagnostic interest. It is, however, likely to be true on a local scale over most of the image. Thus this is a measure which, over most of the image is expected to be robust under dynamic contrast enhancement making it highly suitable for MRI.

A variation of this is the measure of normalised mutual information $M_n(X,Y)$, which is defined as the ratio of joint and marginal entropies of the images and is designed to consider the amount of mutual information with respect of the information provided by the individual images:—

$$M_n(X, Y) = \frac{H(X) + H(Y)}{H(X, Y)}$$

Without this normalization, a registration algorithm will favour transformations which result in high marginal entropies of the two images, rather than transformations which maximize the proportion of information shared between the images. The only problem with the normalization is that it results in two image locations which are similar but have very little information (i.e. uniform intensity) being considered as important as two locations which are rich in information (i.e. textured).

A further variation on mutual information which again seeks to normalise with respect to the information in the individual images is the entropy correlation coefficient which is defined as:—

$$C_e(X, Y) = \frac{2M(X, Y)}{H(X) + H(Y)}$$

The present invention can use any of these as the similarity measure, the choice being dictated by the nature of the images being corrected.

Figure 4:
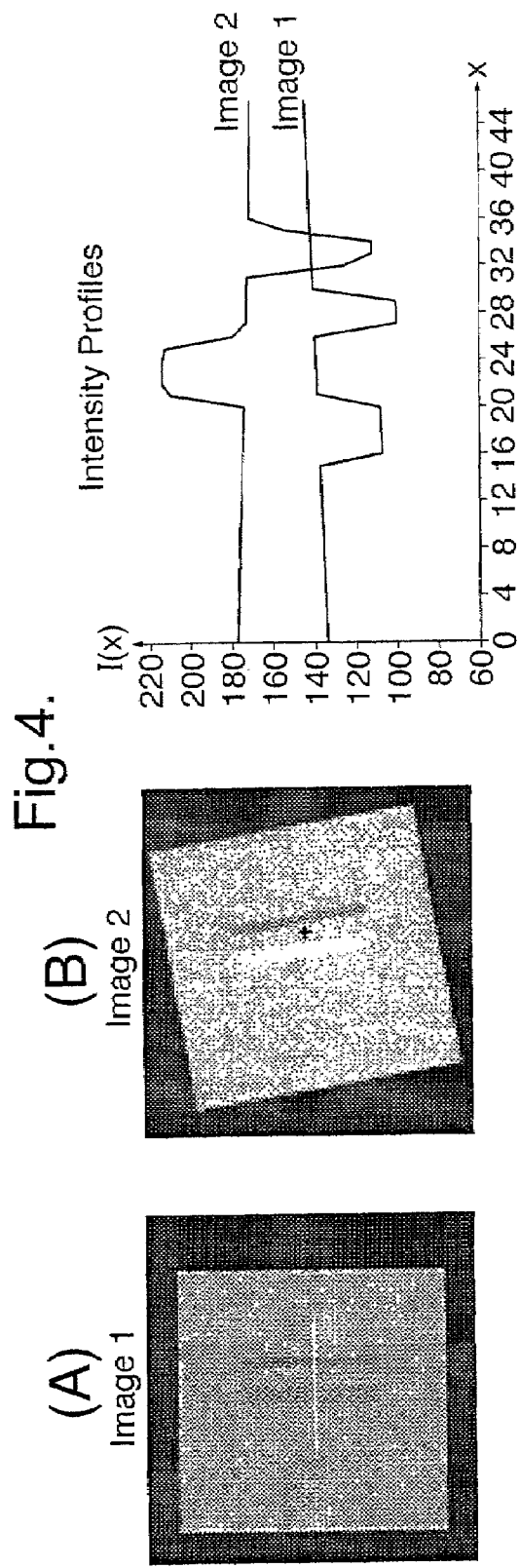
FIGS. 4(A) to (F) illustrate comparisons of different similarity measures under contrast enhancement.
Figure 4:
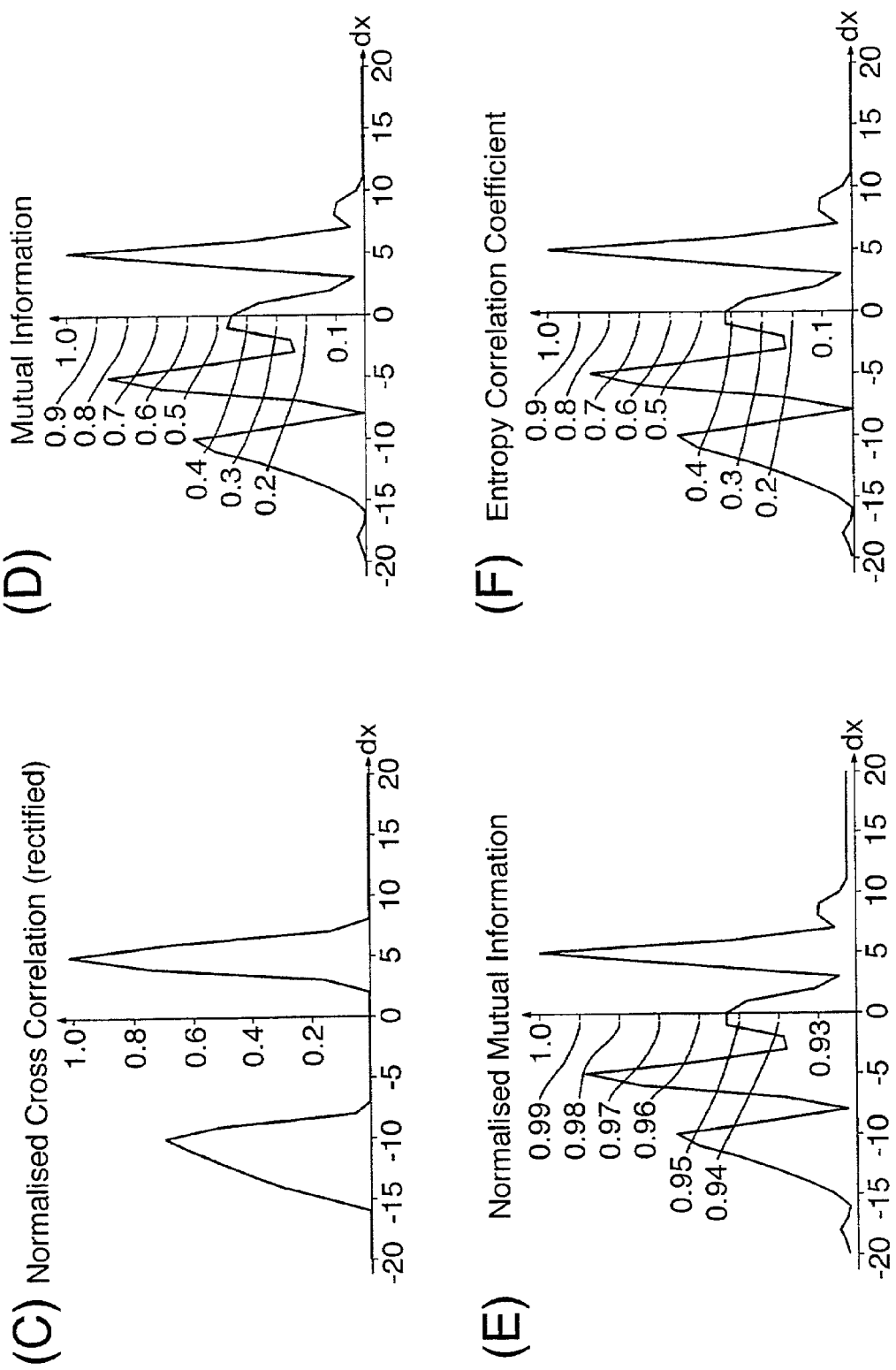

FIG. 4 illustrate the results of applying these different types of similarity measure to a test image. The two test images are shown in FIG. 4. Image 1 has an intensity gradient in the x-direction and two artificial features (to simulate ducts or blood vessels). Image 2 was created from image 1 by translating it by 5 pixels, rotating it by 10° and increasing the intensity by 40% (the 2 features were different enhancements—100% and 10% respectively) and the intensity gradient present in the first image was reversed in direction. The similarity measures were tested by selecting a point for the similarity kernel in image 2 and translating the kernel in image 1 by an amount −20<dx<20 and calculating the similarity measures between the two kernels. The correct result is a maximum similarity at dx=+5—the translation between the two images.

FIG. 4 also shows the results of this experiment. Note that with normalised cross-correlation, only positive correlations (enhancement) are of interest so the graph shows the rectified (minimum value is zero) cross-correlation. As can be seen from the variations in the computed similarity measures, all four measures normalised cross-correlation, mutual information, normalised mutual information and the entropy correlation coefficient have a maximum at dx=5 (the correct displacement between the images). On the basis of these results alone it is difficult to choose between the similarity measures for use in contrast enhanced breast MR images (and indeed in tests on real images, good results have been achieved with all four similarity measures). However the choice of similarity measures is made on the basis of understanding what each of the similarity measures mean. The difference between these measures is that normalised cross-correlation measures the error or disagreement between two locations whereas the three information measures compute the supporting evidence or agreement. Contrast enhancement causes local areas of disagreement (changes in the image) where the contrast is taken up strongly i.e. the area is potentially suspicious. A registration algorithm based on normalised cross-correlation would attempt to reduce these areas of disagreement, potentially causing a tumour to be missed. Consequently, mutual information is a more suitable similarity measure for breast MR image registration. For other applications than breast MRI other similarity measures are usable. For instance, normalised cross correlation can be used for ultrasound images or standard (ie CCD) images.

Having decided on the similarity measure to be used, it is then necessary to use it to detect the non-rigid motion field.

In the following, the similarity measure (chosen from those mentioned above) between two patches at $(x,y)^T$ in image 1 and $(x+u, y+v)^T$ in image 2 will be expressed as $S(r,u)$ where $r=(x,y)^T$ and $u=(u,v)^T$.

Firstly the two images which are to be compared and registered (ie the second will be transformed to eliminate the effects of motion) are processed using the selected similarity measure to produce a set of possible (or "candidate") movements for each of a plurality of sampling points across the image together with the probabilities of each of those candidates. The way this is achieved using mutual information is that firstly a desired grid of sampling points is selected. For instance, in the examples described later on and illustrated in FIGS. 6 to 9, at a first scale the sampling points were selected as every third pixel. Then for each of these sampling points in the first image the mutual information for the possible displacements of that point are calculated. This involves the calculation of the three terms $H(X)$, $H(Y)$ and $H(X, Y)$ of equation (1) by summing over a certain number of pixels (the "kernel" size) around the sampling point the product of the image intensity with its natural log. The term $H(X)$ (the entropy in the first image) is, obviously, a constant for a given sampling point, while the term $H(Y)$ (the entropy in the second image) varies for each possible displacement being considered. In the examples shown in FIGS. 6 to 9 the kernel size for calculating the mutual information was taken as 15×15 pixels. Thus the product of the image intensities with their natural log is summed over a 15×15 pixel window centered on the sampling point in the first image, and the same is done for respective 15×15 pixel windows centered on respective differently displaced pixels in the second image. The number of different displacements considered and the scale is chosen according to the expected motion. In the examples shown in FIGS. 6 to 9 displacements of up to 6 steps (one step is the distance between sampling points) in any direction were considered (this is enough because the movement of the breast is constrained by the double breast coil). Thus, for instance, in the second image the mutual information of respective 15×15 windows centered on the pixels displaced by steps of (−6, −6), (−5, −6), (−4, −6) etc. from the position of the sampling point in the first image are calculated. An example of this for two sampling points on a simple image is illustrated in FIGS. 10 and 11. In FIG. 10 image 1 is a square which is, in image 2, translated slightly to the right and slightly vertically. FIG. 11 illustrates the similarity scores for the possible displacements of two sampling points A and B in image 1. For point A, the top lefthand corner of the square in image 1, the similarity score for a displacement of (3, 3) is maximum (i.e. 100) and this is unique because point A can be identified unambiguously in image 2 as being the top lefthand corner. For point B, on the other hand, its position along the bottom edge is ambiguous and there are several possible displacements (illustrated by the multi headed arrow in FIG. 10) each of which has a maximum score of 100. These displacements are (0, 3), (1, 3), (2, 3), (3, 3), and (4, 3). Other displacements have lower scores.

It will be appreciated that the arrays of scores shown in FIG. 11 are for just the two points A and B in image 1, and in fact it is necessary to calculate the corresponding array of scores for each of the sampling points over image 1. Each of the scores in the array corresponds to a possible displacement (corresponding to its position in the array) and its score corresponds to the probability of that displacement being the correct one.

Thus these initial similarity scores are considered as estimates of the "prior" probabilities of those motions. Then these estimates are refined in an iterative probabilistic way. In this embodiment Bayes' theorem is used locally to update the estimated probability of each motion given the current motion field and a model of the deformation. Bayes' theorem can be expressed as:

$$P(Y \mid x) = \frac{P(x \mid Y) P(Y)}{P(x)}$$

where $P(Y|x)$ is the probability that the answer or "state" is Y given the measured values x. On the right hand side of the equation, $P(x|Y)$ is the probability of the measurements x given that the "state" is Y (the class conditional probability).

Bayes' theorem can hence be used to recompute (or update) the probability of a motion u at x, given the surrounding motion:

$$P(u_x | u_{S\setminus x}) \alpha P(u_{S\setminus x} | u_x) P(u_x) \quad (2)$$

where $P(u_x)$ is the prior probability of displacement (motion) u at location x and $u_{Sx}$ denotes the motion flows of the surrounding locations. The denominator $P(x)$ of the right hand side of Bayes' Theorem is a normalization factor, which results in the sum of the posterior probabilities being 1.0. The same thing is achieved in the present embodiment by normalizing the estimates of $P(u_x)$ after each iteration:

$$P_{norm}(u'x) = \frac{P(u'x)}{\sum_n P(u_x)} \quad (3)$$

Thus to update the probability using the equation (2) above a model of $P(u_{Sx}|u_x)$ is required which expresses the model of deformation. Considering only models whose conditional dependencies are locally dependent:

$$P(u_{S\setminus x} | u_x) \equiv P(u_{\delta x} | u_x)$$

where $u_{\delta x}$ denotes the motion flows at locations immediately adjacent to x.

An assumption is then made that the probabilities of motions at two different neighbouring, sites given the true motion at x are independent of one another. With this assumption, the joint conditional probability is the product of the probabilities at each neighbouring site:

$$P(u_{\delta x} | u_x) = \prod_{\delta x} P(u_{x+\delta x} | u_x)$$

The probabilities of the different motions at a single location, on the other hand, are not independent because they are all part of the same distribution. Thus in the present embodiment taking the maximum one as an estimate of $P(u_{x+\delta x}|u_x)$ leads to a suitable model for $P(u_{S\setminus x}|u_x)$:

$$P\left(u_{\delta x} | u_x\right) = \prod_{\delta x} \max_{v \in V_u} \left( P(v_{x+\delta x}) \exp^{-\left(\frac{(v-u)^2}{2\sigma_u^2}\right)} \right) \quad (4)$$

where $P(v_{x+\delta x})$ is the probability of motion v at $x+\delta x$ and $N_u$ is the set of motions similar to u (the set of motions such that $|v-u|<\epsilon$). Thus the model in equation (4) considers each neighbouring location $x+\delta x$ and for each neighbouring location that one of the of similar motions $u+\delta u$ which has the maximum probability is taken, weighted by a Gaussian (the exponential term). The probability of the surrounding motions given u as the correct motion is estimated as the product of these weighted maxima from each location.

It will be noted that the equation (4) requires multiplications and taking maxima. It is therefore computationally cheaper to take logarithms of the similarity data so that all multiplication operators become additions. The model equation (4) then becomes:

$$P_{\log}(u_{\delta x} \mid u_x) = \sum_{\delta x} \max_{v \in V_u} \left( P_{\log}(v_{x+\delta x}) - \left(\frac{(v-u)^2}{2\sigma_u^2}\right) \right)$$

and the update equation is given by substituting this in a log version of equation (2):

$$P_{log}(u_x|u_{S|x}) \propto P_{log}(u_{S|x}|u_x) + P_{log}(u_x)$$

which gives $$P_{\log}(u_x \mid u_{S|x}) \alpha \sum_{\delta x} \max_{v \in V_u} \left( P_{\log}(v_{x+\delta x}) - \left(\frac{(v-u)^2}{2\sigma_u^2}\right) \right) + P_{\log}(u_x) \quad (5)$$

After applying equation (5) iteratively, the resulting motion field can be computed by taking as the estimate of the motion at each sampled point in the image, the motion corresponding to the maximum posterior probability:

$$u(x) = \max_{P(u_x|u_{S|x})} \{u_x\} \quad (6)$$

The complete algorithm can be summarized as follows:—

1. Compute similarity scores using a K×K pixel kernel (K=15 in this example) at a set of equally spaced sample locations (grid size=3 pixels in this example) across the image for all possible motions (actually up to a maximum displacement of 6 steps of 3 pixels in this example) according to equation (2).

2. Normalize the set of similarities at each location to estimate the prior probabilities $P(u_x)$ using equation (3).

3. Take natural logarithms of the prior probabilities.

4. Compute the posterior probability of each motion given its surrounding estimates using the update equation (5).

5. Re-normalize the estimated probabilities. Go to Step 4 unless the required number of iterations (20 in the examples shown in FIGS. 6–9) have been completed. The number of iterations is dependent on the distance information must propagate to interpolate between features.

6. Find the motion field by taking, as the estimate of the optic flow at each location, the displacement corresponding to the maximum posterior probability using equation (6).

The types of deformations allowed by the algorithm are implicit in the model for $P(u_{\delta x}|u_x)$. The model is designed to minimize $$\frac{\delta u}{\delta x}.$$

The behaviour of the algorithm is influenced by the following parameters:

The variance $\sigma_u$ in $P(u_{\delta x}|u_x)$ controls the probability of $\delta u$ in $$\frac{\delta u}{\delta x}.$$

The grid sampling frequency (the spacing over which motion estimates are taken) scales $\delta x$ in $$\frac{\delta u}{\delta x}.$$

Hence, for a given sampling frequency $\delta x$, the variance $\sigma_u$ can be computed to control $$\frac{\delta u}{\delta x}.$$

The similarity scores are computed at a set of equally-spaced locations across the images. The number of iterations required to compute the posterior probabilities depends on the sample frequency of the motion flow estimates.

Thus using the above technique the probability for each of the several candidate movements at each sampling point is refined in an iterative process based on the maximum probable movement of the surrounding sampling points. When the iterative process has finished the motion field is taken as being that given by the most probable candidate movement of each sampling point.

It will be appreciated that the sampling points do not correspond to individual pixels. Thus in order to correct an image it is necessary to have an evaluation of the movement for each pixel of the image. A simple way of calculating the movement for each pixel would be to interpolate the motion vectors at the nearest sampling points to the pixel. However, a better method is to fit a parametric transformation to the motion flow field which gives a smooth, continuous transformation which can be evaluated at any location. This method is described and developed by Declerck in Declerck, J., Subsol, G., Thirion, J., and Ayache, N. Automatic retrieval of anatomical structures in 3D medical images. Technical report, INRIA, 1995 and Declerck, J., Subsol, G., Thirion, J. P., and Ayache, N. Automatic retrieval of anatomical structures in 3d medical images. In Ayache, N., editor, *First international conference on computer vision, virtual reality and robotics in medicine, CVRMed'95*, Nice, France 1995. Springer-Verlag. Lecture Notes in Computer Science, which are hereby incorporated by reference.

The registration algorithm can be further improved by repeating the process using different, more closely spaced sampling points. In the examples of FIGS. 6–9, one repeat was made using a grid size (sampling point spacing) of 3 pixels, a maximum displacement of 3 in steps of 2 pixels, the same 15×15 kernel and only 10 iterations. Thus the initial processing at a first scale above computes an approximate transformation by sub-sampling the images and sub-sampling the possible displacements. Subsequent repeat processing uses progressively finer sampling of the images and displacements.

Thus the complete algorithm can be summarised as follows:—

1. Compute similarity scores at a set of locations across the image for sampled possible displacements according to equation (2).
2. Normilize the set of similarities at each location to estimate the prior probabilities $P(u_x)$ using equation (3).
3. Take natural logarithms of the prior probabilities.
4. Compute the posterior probability of each optic flow given its surrounding estimates using the update equation (5).
5. Re-normalize the estimated probabilities. Go to Step 4 unless the required number of iterations have been completed.
6. Find the motion field by taking, as the estimate of the optic flow at each location, the displacement corresponding to the maximum posterior probability using equation (6) and compute a parametric transformation between the images.
7. Transform the subsequent image $I_2^n$ to obtain the motion corrected image $I_2^{n+1}$.
8. Go to step 1 and repeat at the next finer scale.

Figure 5:
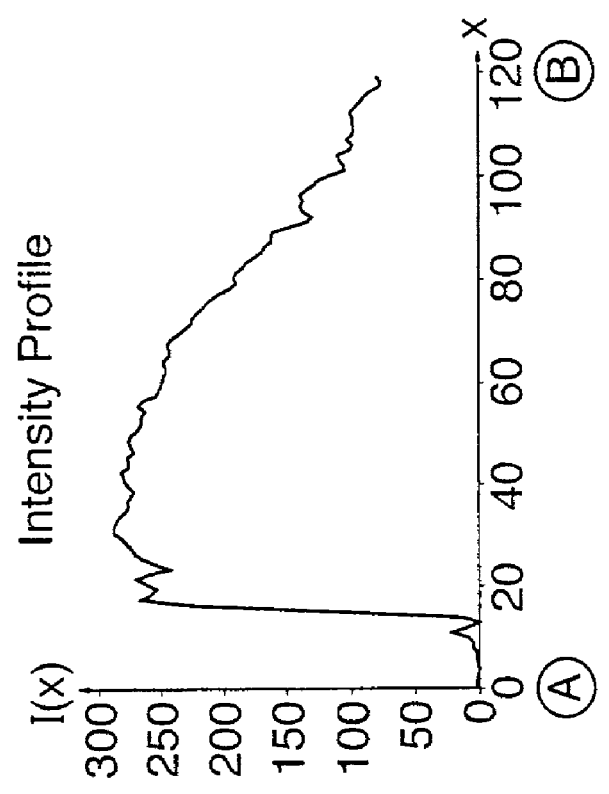
FIG. 5 illustrates a typical MRI image and the intensity profile as affected by the bias field of the MRI apparatus.
Figure 5:
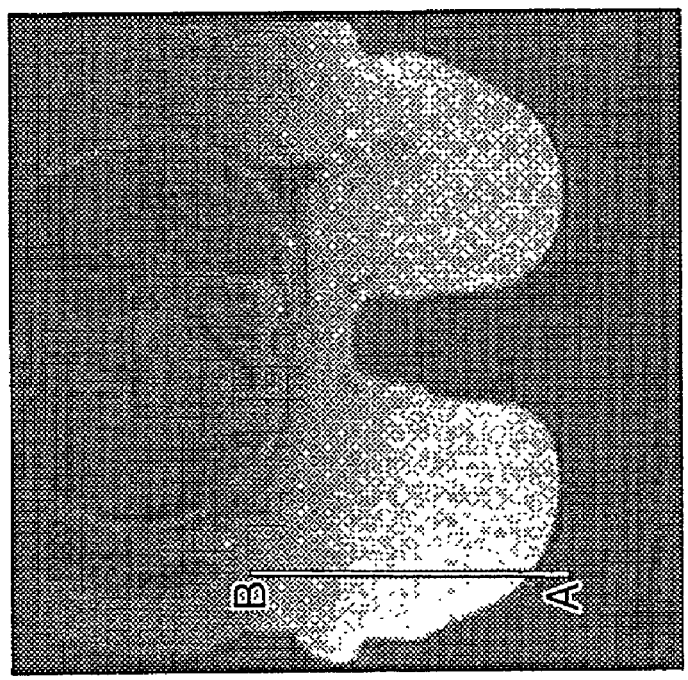

In certain cases, MR images are corrupted by substantial "bias" field. FIG. 5(B) illustrates the variation in MR signal level across of region of fat in the breast for the scan shown in FIG. 5(A). The present embodiment uses a model-based technique to correct for the bias field.

When the breast moves, its position in the bias field $B(x,y)$ changes. Consequently, even without enhancement, there is an expected intensity change. In the presence of movement, the apparent contrast enhancement is computed as:

$$CE_{apparent} = \frac{I_{post}(x+u, y+v)}{I_{pre}(x, y)}$$

The true enhancement is $$CE_{true} = \frac{I_{post}(x+u, y+v)}{B(x+u, y+v)} \bigg/ \frac{I_{pre}(x, y)}{B(x, y)}$$

$$= \frac{I_{post}(x+u, y+v)}{I_{pre}(x, y)} \cdot \frac{B(x, y)}{B(x+u, y+v)}$$

The effective change in Post-Contrast Signal level due to movement through the bias field (the signal change in $I_{post}$ with respect to the difference between the apparent and true contrast enhancement) is therefore:

$$\Delta I = I_{post}(x+u, y+v) - I_{post}(x+u, y+v)\frac{B(x, y)}{B(x+u, y+v)} \quad (7)$$

$$= I_{post}(x+u, y+v)\left(1 - \frac{B(x, y)}{B(x+u, y+v)}\right) \quad (8)$$

For registration of images, the intensity change due to movement through the bias field can be considered as an enhancement (although this may be negative). It is important to note this effect, however, since the purpose of motion correction is to allow accurate computation of the contrast enhancement in the breast and the effect of the bias field on the motion-corrected images will result in an apparent increase or decrease in the amount of contrast enhancement. Consequently, whether or not the images are bias-corrected before computing the motion field (it makes very little difference to the performance of the algorithm) they must be bias-corrected before correcting for the computed motion field, or at least compensated for the motion through the bias field using equation (8).

FIGS. 6 to 9 illustrate the application of the present invention to actual MRI sequences.

Figure 6:
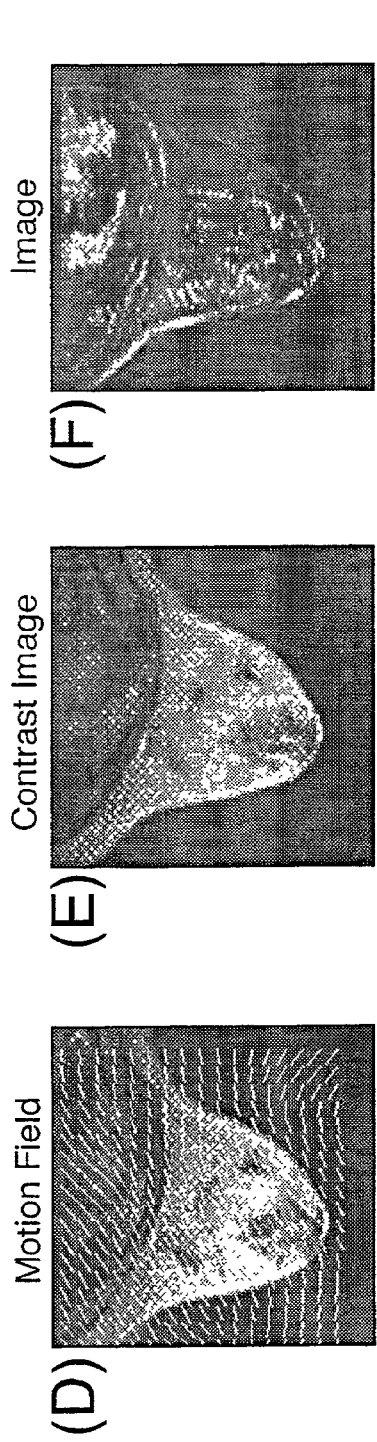
FIG. 6 illustrates results of the application of an embodiment of the present invention to pre and post-contrast MR images.
Figure 6:
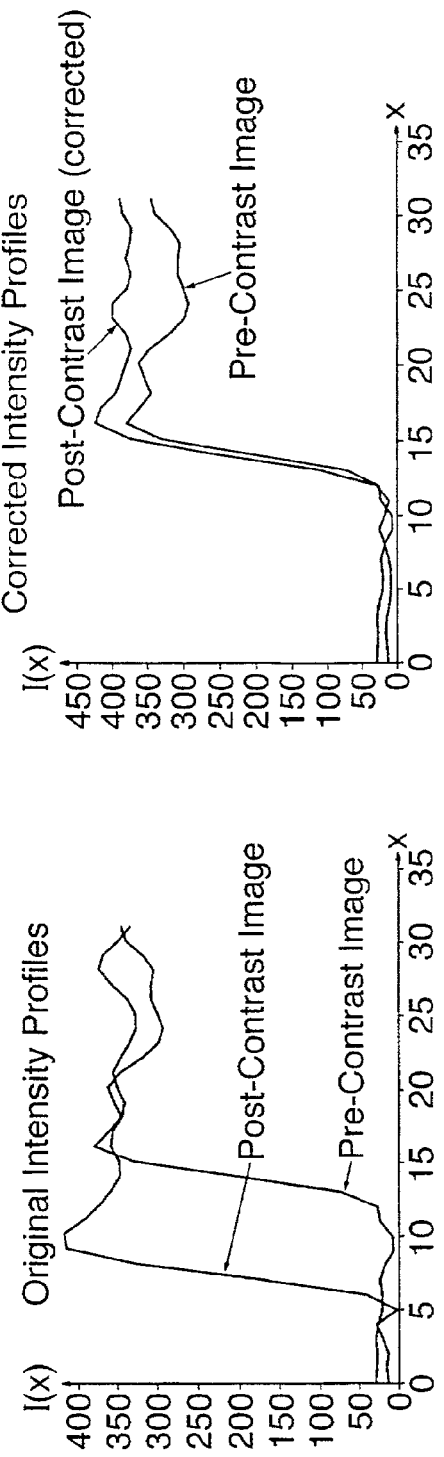

FIG. 6 illustrates results from a patient who moved by approximately 10 mm during the scanning process. FIG. 6A illustrates the pre-contrast image and FIG. 6B the post-contrast image. FIG. 6C illustrates the result of subtracting one from the other without correction for this motion. In reality the sequence was near impossible to interpret because of the movement. FIG. 6D illustrates the motion field as calculated by the present invention and FIG. 6E the corrected post-contrast image. The result of subtraction of this corrected image from the pre-contrast image is shown in FIG. 6F, which is visibly clearer than FIG. 6C. The intensity profiles shown at the bottom of FIG. 6 illustrate the results of the correction graphically. These demonstrate, in particular, the accuracy of registration at the left breast edge. The horizontal displacement between the resulting breast edges in the corrected subtraction image is less than half a pixel.

Figure 7:
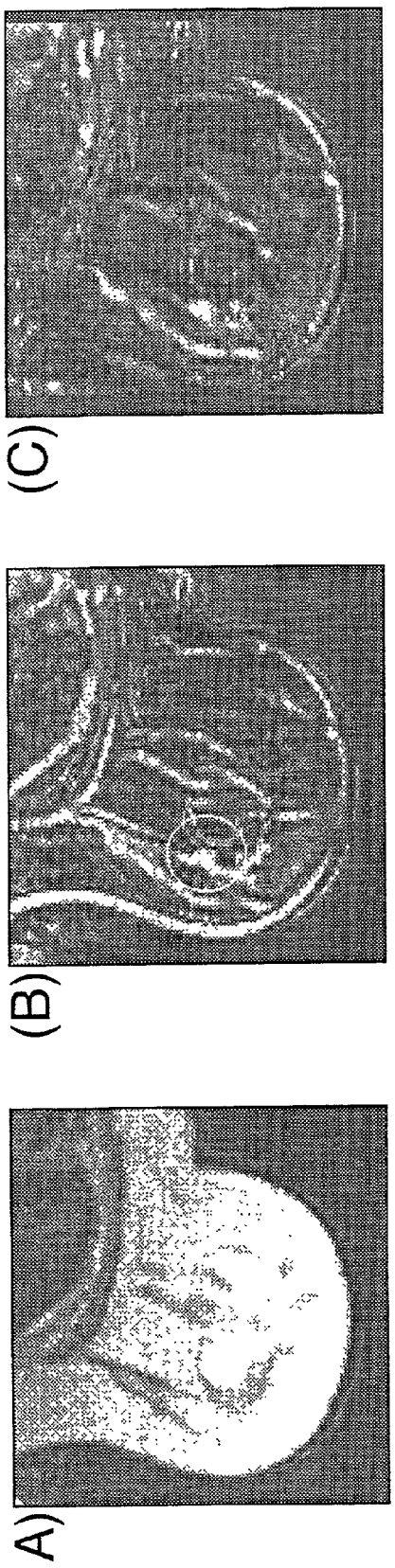
FIG. 7 illustrates further results of an embodiment of the present invention as applied to pre and post-contrast MR images.
Figure 7:
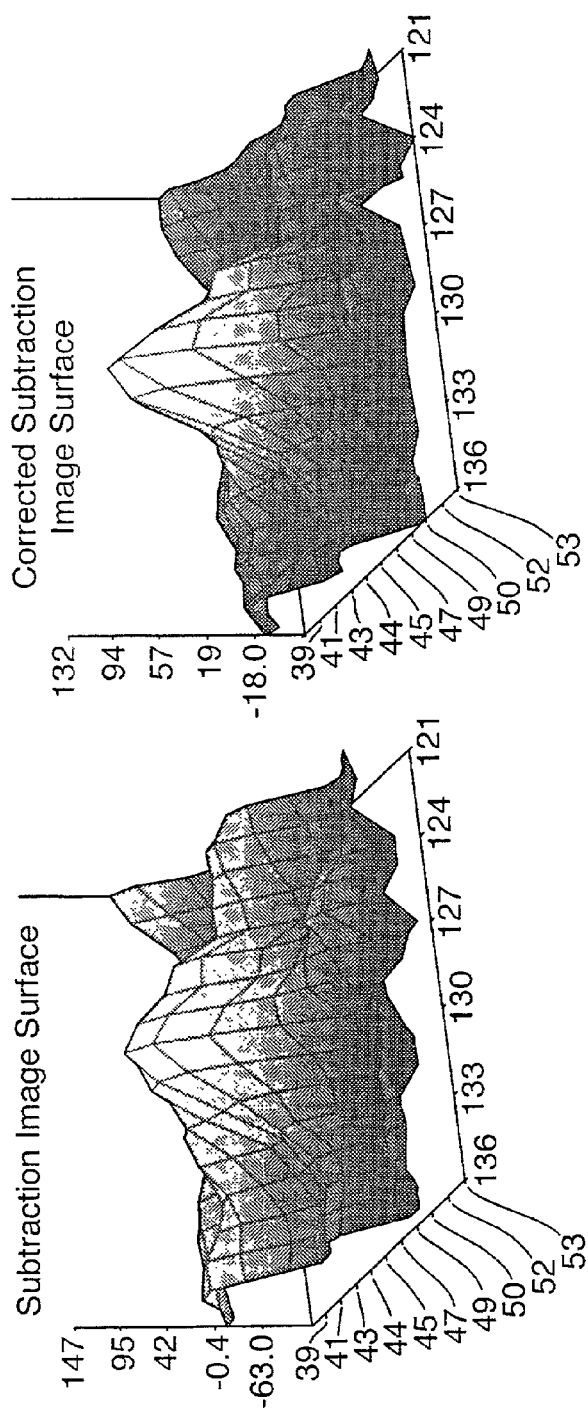

In FIG. 7, FIGS. 7A and 7B show the pre-contrast and subtraction images respectively. A tumour is present which is circled in the subtraction image. The patient moved approximately 2 mm between the pre and post-contrast images and FIG. 7C illustrates the corrected subtraction image. The image surfaces are illustrated at the bottom of FIG. 7 and the surface is more strongly peaked in the corrected image, the peak corresponding to the tumour.

Figure 8:
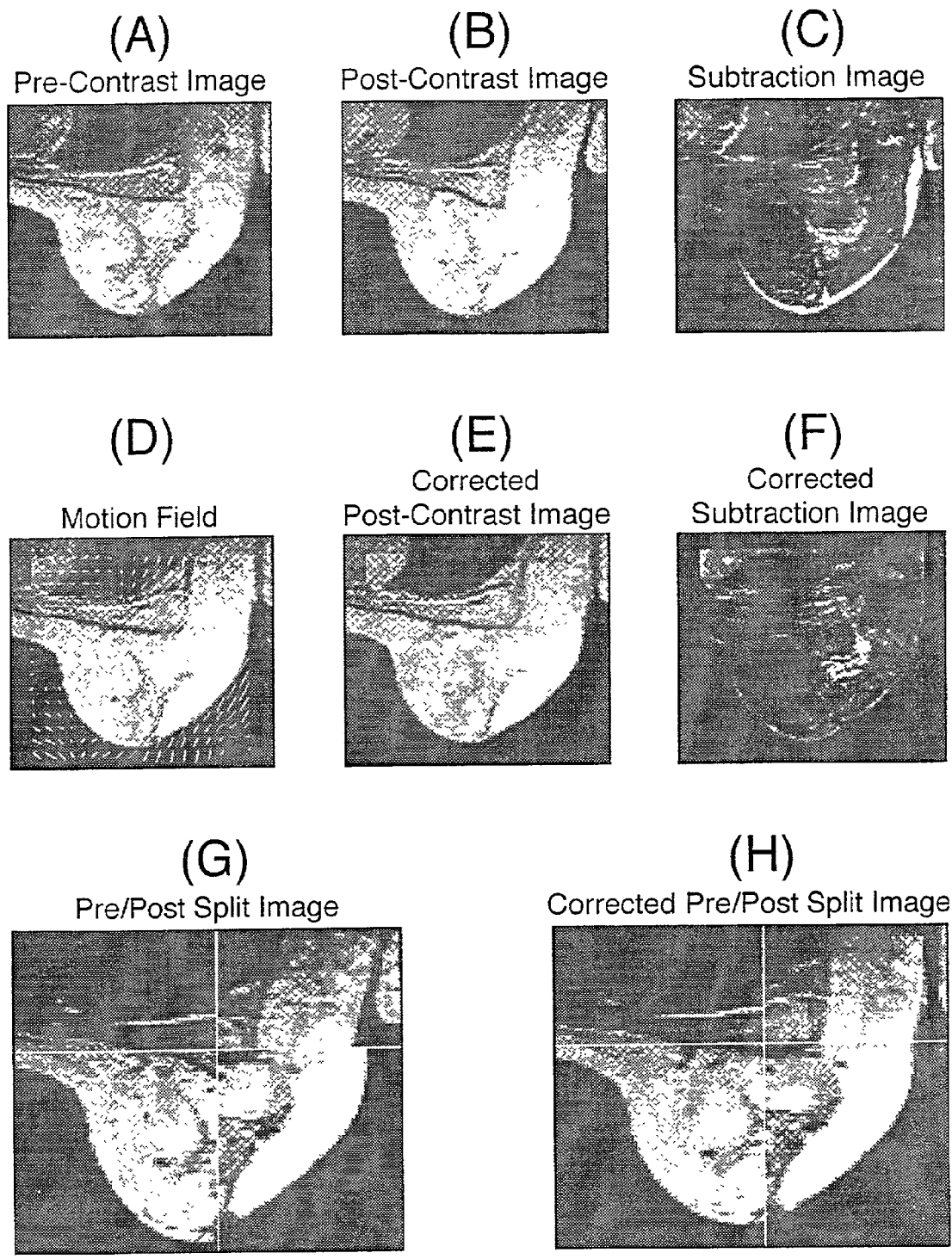
FIG. 8 illustrates results of applying an embodiment of the present invention to pre and post-contrast MR images.

In FIG. 8 the invention is applied to a post-contrast image for a patient who relaxed the pectoral muscles between the pre and post-contrast acquisitions. FIG. 8A shows a pre-contrast image, FIG. 8B a post-contrast image and FIG. 5C a subtraction image without correction. The motion field calculated by the present invention is shown in FIG. 8B and the correspondingly corrected post-contrast image in FIG. 8E. Subtraction of this corrected image from the pre-contrast image results in FIG. 8F. In this sequence the movement is extremely non-rigid in that the pectoral muscle changes shape and moves approximately by 15 mm. There is also a tumour which moves about 7 or 8 mm within the breast, but the movement is confined almost entirely within the breast, the edge moving about only 3 mm (demonstrating the significant non-rigid nature of the problem). Using the invention there is only a 1-pixel error between the edge in the pre and corrected post-contrast image as shown in FIG. 5F and illustrated in the split images of FIGS. 8G and 8H. FIG. 8G shows a pre-contrast/post-contrast split image without motion correction, whereas FIG. 8H shows the corresponding split image with correction. It can be seen that the boundaries of the various features are aligned in the corrected image.

In the discussion of similarity measures above, several different possibilities were mentioned. FIG. 9 illustrates the results of using the different similarity measures in the present invention. FIG. 9A shows the basic pre-contrast image and FIG. 9B the post-contrast image. FIGS. 9C, D and E show respectively the motion field, corrected post-contrast image and corrected subtraction image using normalised cross-correlation. FIGS. 9F, G and H show the motion field, corrected post-contrast image and corrected subtraction image respectively using mutual information. It can be seen that in FIG. 9E using normalised cross-correlation, the algorithm has computed the motion incorrectly in the region around the tumour, which is precisely the location in which it is required to be most accurate. Using mutual information, however, no such problems occur.

What is claimed is:

1. A method of processing image data of a plurality of time-separated images of a body to detect non-rigid movement of the body, comprising the steps of:
   for each of a plurality of sampling points in each image, calculating and storing a plurality of candidate movements together with the estimated probability of each candidate;
   recalculating for each sampling point the probability of each of the candidate movements based on the stored probability of that candidate movement and the probabilities of the candidate movements at adjacent sampling points; and
   generating from the recalculated probabilities a motion field indicative of the non-rigid movement,
   wherein said step of recalculating comprises:
   iteratively selecting each of a plurality of surrounding motion probabilities from the stored probabilities of candidate movements for each of a plurality of the adjacent sampling points, said selection at each adjacent sampling point being performed on the basis of the stored probabilities for that sampling point, and
   recalculating the probability based on the stored probability of that candidate movement and said plurality of surrounding motion probabilities.

2. A method according to claim 1, wherein the sampling points correspond to unit areas containing a set of pixels of the image.

3. A method according to claim 1, wherein the plurality of candidate movements and their probabilities are calculated by calculating a similarity measure indicating the similarity of each sampling point to sampling points in the preceding image, and normalizing the similarity measures to sum to unity, the normalised similarity measures being stored as said probabilities, and the candidate movements are the corresponding vector displacements which map the sampling point to the respective sampling points in the preceding image.

4. A method according to claim 3, wherein the similarity measure is selected from mutual information, normalised mutual information, entropy correlation coefficient and centered cross correlation.

5. A method according to claim 1, wherein the recalculation of the stored probabilities comprises multiplying each stored probability by the product of a selected stored probability for each of the adjacent sampling points.

6. A method according to claim 5, wherein the recalculation of the stored probabilities comprises multiplying each stored probability by the product of the respective maxima of the stored probabilities for the adjacent sampling points.

7. A method according to claim 5, wherein the recalculation of the stored probabilities comprises multiplying the stored probability for each candidate movement at each sampling point by the product of the respective maxima of the stored probabilities for the adjacent sampling points, the maxima being weighted according to the difference between said candidate movement and the respective stored movements corresponding to the maxima.

8. A method according to claim 7, wherein the weighting is Gaussian.

9. A method according to claim 1, wherein the recalculations of the probabilities for the movements at each sampling point use only movements at adjacent sampling points which are judged to be similar to the said movements at each sampling point.

10. A method according to claim 9, wherein movements are judged to be similar if the difference in magnitudes of the displacements caused by the movements is less than a preset amount.

11. A method according to claim 1, wherein the number of iterations is set according to the distance between salient points in the image.

12. A method according to claim 1, wherein the motion field is generated by selecting as the movement at each sampling point the candidate movement having the maximum probability after said recalculation.

13. A method according to claim 12, further comprising the step of correcting the plurality of images for the movement by applying thereto a transformation based on the motion field, and then repeating the method of claim 12 using differently spaced sampling points to generate a new motion field.

14. A method according to claim 13, wherein the transformation is calculated by fitting a parametric transformation to the motion field.

15. A method according to claim 13, wherein the steps of correcting the plurality of images for the movement and then repeating the method of claim 12 using differently spaced sampling points, are carried out iteratively with successively more closely spaced sampling points.

16. A method according to claim 1, wherein the images are a sequence of magnetic resonance images of the body taking up a contrast agent.

17. A method according to claim 1, wherein the images are a sequence of magnetic resonance images of a human breast taking up a contrast agent.

18. Apparatus for processing image data of a plurality of time-separated images of a body to detect non-rigid movement of the body, comprising:
   calculating means for calculating, for each of a plurality of sampling points in each image, a plurality of candidate movements together with the estimated probability of each candidate;
   storage means for storing said candidate movements and estimated probabilities;
   recalculating means for recalculating for each sampling point the probability of each of the candidate movements based on the stored probability of that candidate movement and the probabilities of the candidate movements at adjacent sampling points; and
   motion field generating means for generating from the recalculated probabilities a motion field indicative of the non-rigid body movement,
   wherein said recalculating means is adapted to iteratively select each of a plurality of surrounding motion probabilities from the stored probabilities of candidate movements for each of a plurality of the adjacent sampling points, said selection at each adjacent sampling point being performed on the basis of the stored probabilities for that sampling point, and to recalculate the probability based on the stored probability of that candidate movement and said plurality of surrounding motion probabilities.

19. A computer program storage medium readable by a computer system and encoding a computer program for controlling a computer to process image data of a plurality of time-separated images of a body to detect non-rigid movement of the body by a method comprising the steps of:
   for each of a plurality of sampling points in each image, calculating and storing a plurality of candidate movements together with the estimated probability of each candidate;

recalculating for each sampling point the probability of each of the candidate movements based on the stored probability of that candidate movement and the probabilities of the candidate movements at adjacent sampling points; and generating from the recalculated probabilities a motion field indicative of the non-rigid body movement, wherein said step of recalculating comprises:

iteratively selecting each of a plurality of surrounding motion probabilities from the stored probabilities of candidate movements for each of a plurality of the adjacent sampling points, said selection at each adjacent sampling point being performed on the basis of the stored probabilities for that sampling point, and recalculating the probability based on the stored probability of that candidate movement and said plurality of surrounding motion probabilities.

20. Apparatus configured to perform the method of claim 1.

* * * * *